Figure 1:
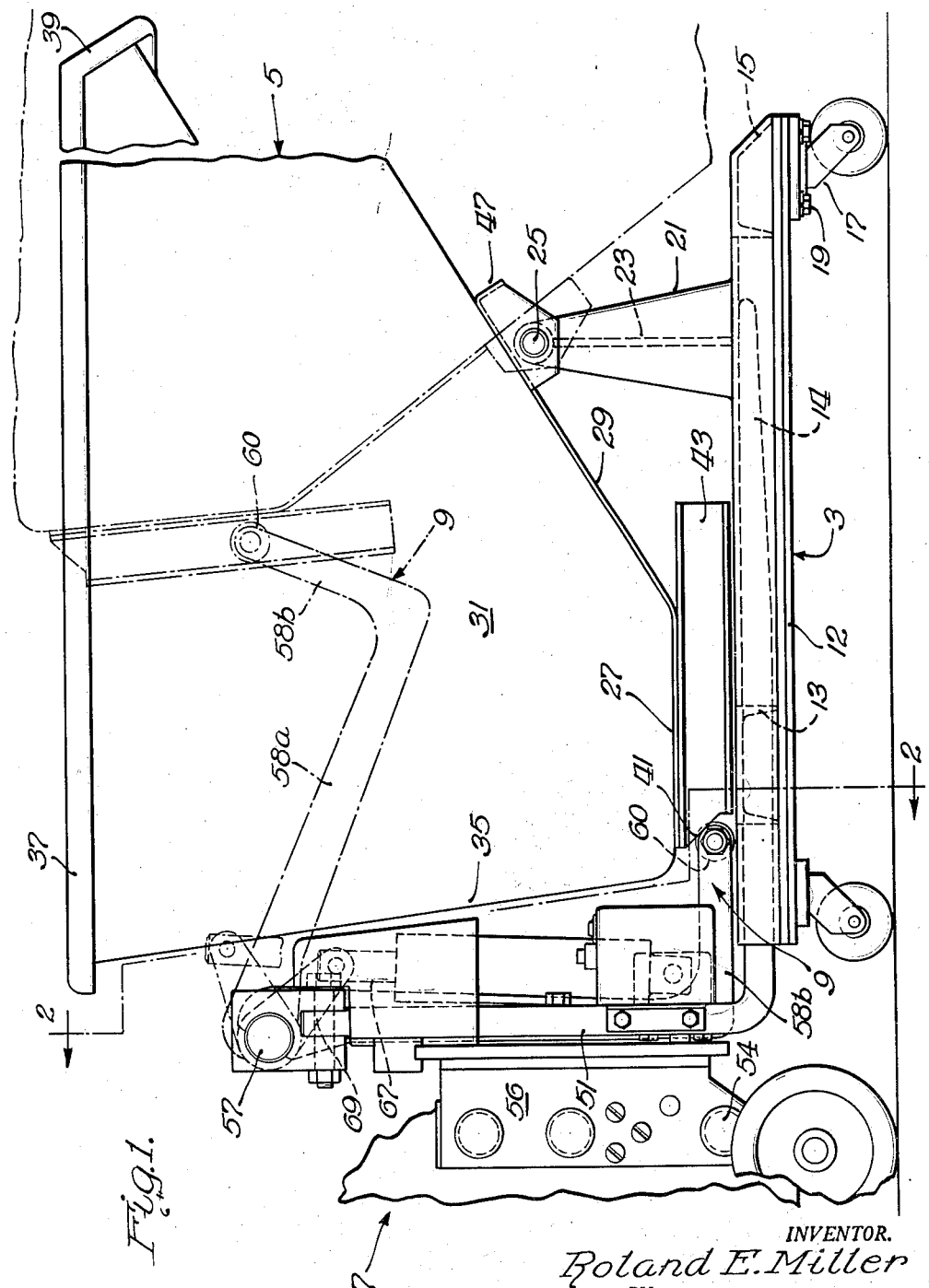

Patented June 17, 1952

2,601,163

UNITED STATES PATENT OFFICE 2,601,163

DUMPING DEVICE

Roland E. Miller, Freeport, Ill., assignor to Kraft Foods Company, Chicago, Ill., a corporation of Delaware Application August 31, 1950, Serial No. 182,600

5 Claims. (Cl. 214—64)

The present invention relates generally to a dumping device and more specifically to a load basket or hopper and a power operated dumping mechanism which is particularly adapted for use with an industrial tractor such as a lift truck, the dumping mechanism including means on the industrial tractor which co-operates with means on the hopper to tilt the hopper, thereby dumping its contents.

In many industries it is necessary to transport materials from one part of a plant to another. This transport is often accomplished, where operations are intermittent, by the use of transportation devices such as industrial tractors which engage load baskets or hoppers which carry the material to be moved. The usual load basket or hopper is pivotally supported upon a movable skid or pallet and means are provided for manually dumping the material contained in the hopper. The dumping means usually comprises a latch which locks the hopper to the skid, the hopper being so proportioned that the load is off center so that the release of the latch causes the hopper to tilt and dump itself. On the other hand, when the hopper is empty, the center of gravity is so situated that the hopper moves back to an upright position.

In use, the hopper is filled with the material to be transported and the skid is engaged by the tractor and moved to the place where the material is to be delivered. If a lift truck is used, it makes possible more flexible operation since it can raise the hopper to dump the contents at any desired height. When the load is to be dumped, the latch which locks the hopper to the skid is released and the weight of the load causes the pivotally supported hopper to dump the entire load. The empty hopper will then automatically reright itself.

Although the known types of dumping devices are satisfactory for certain purposes when the entire load is to be instantaneously dumped, they have proven unsatisfactory whenever it is found necessary to exert control over the amount of material to be dumped at one time or the rate at which the material is to be dumped. For example, the known load baskets are entirely unsuitable when it becomes necessary to handle viscous fluids or semifluid and to control their discharge at the delivery point. In accomplishing such control it is necessary for the operator to regulate the movement of the hopper at all of its positions.

Hence, the object of the present invention is to provide a load basket and dumping device wherein the tilting of the hopper is accurately controlled by an operator, thereby overcoming the difficulties inherent in previous apparatus. A more specific object of the invention is the provision of a load basket or hopper having a power operated tilting mechanism and which is readily engageable and disengageable with an industrial tractor. Other objects and advantages will be apparent upon reference to the following description and the accompanying drawings of one preferred embodiment thereof.

Figure 2:
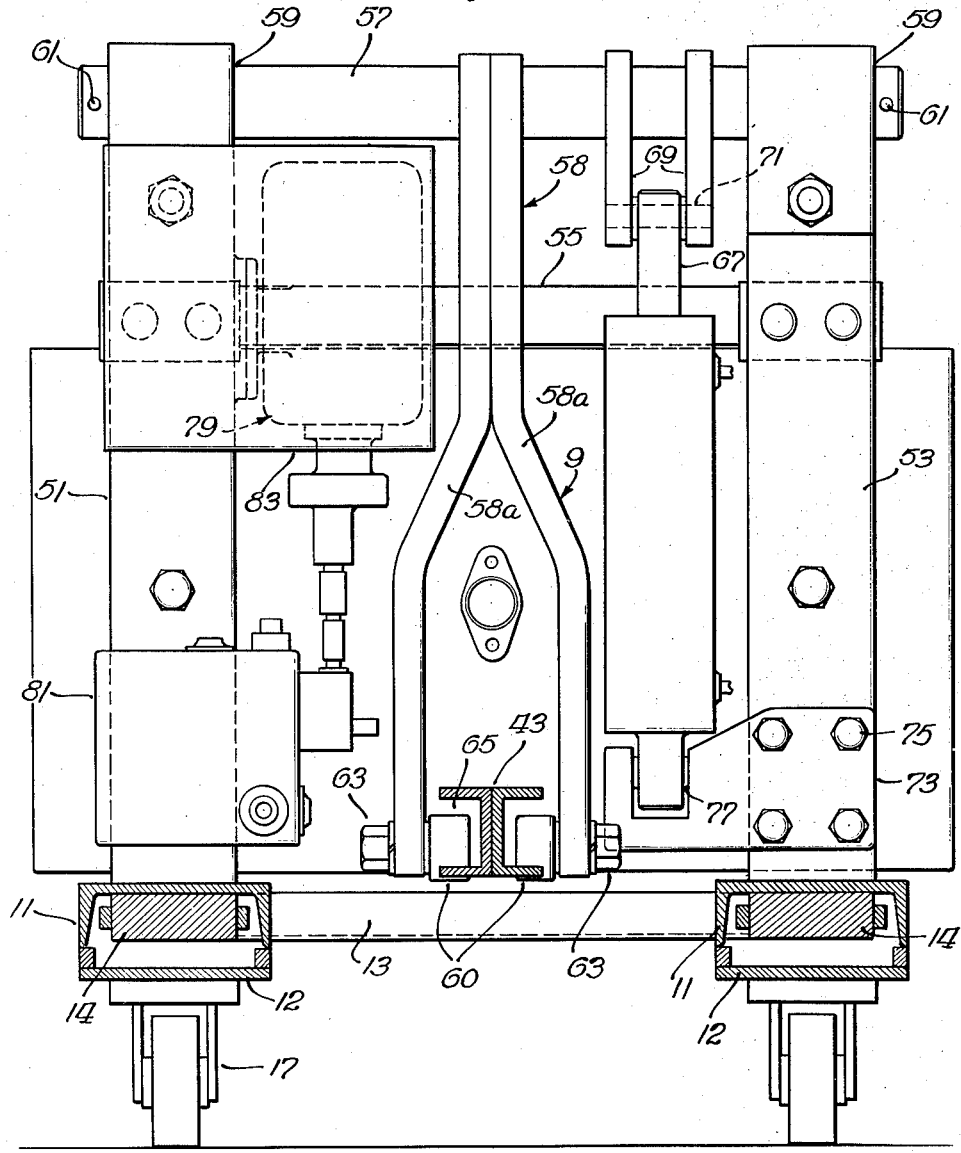

Fig. 1 is a fragmentary side elevational view of an apparatus embodying various features of my invention; and Fig. 2 is a sectional view taken on line 2—2 of Fig. 1.

In general, my improved dumping device includes a dolly or skid 3 upon which is tiltably supported a load basket or hopper 5 which is adapted to receive the material to be transported. The dolly 3 is engageable with the load engaging means of an industrial tractor such as the forks of the illustrated lift or fork truck 7 so that the load basket 5 and dolly 3 can be moved about the plant. In order to provide control over the dumping of the load, the tractor is provided with a power operated mechanism which includes an operating member 9 which is positioned to engage the hopper 5 of the dumping device when the load engaging means of the tractor engages the dolly 3. Thus the tractor can be engaged with the dumping device to move it to any desired location where the material is to be delivered, the load can be dumped at a controlled rate by the power operated mechanism, and the tractor and power operated mechanism can be readily disengaged from the dumping device while it is being refilled. This makes possible the use of a single tractor as the prime mover and control for a plurality of load baskets.

In the illustrated device, the dolly 3 is of fabricated construction and includes a pair of side channels 11 and a pair of cross beams 13 and 15. As illustrated, each of the side channels 11 are provided with a lower panel 12 which is welded or otherwise attached to the channels 11 to provide a boxlike receptacle for receiving the forks 14 of the lift truck 7. However, other suitable means may be employed to effect engagement between the dolly 3 and the truck with which it is to be used. In order that the dolly 3 be movable, four casters 17 are attached to the under side of the channels 11 by means of the bolts 19.

In order to provide a pivotal support for the hopper 5, two vertical side brackets 21 are rigidly connected at their lower ends to channels 11 and these brackets are reinforced by a cross support such as the web 23 which is attached to the inner sides of side brackets 21. A shaft 25 is journalled into and extends between the upper ends of the brackets 21 and provides an axis of rotation for the hopper 5.

The hopper 5, illustrated, includes a bottom panel 27, a rearwardly inclined front wall 29, a pair of side walls 31, and a rear wall 35. In order to reinforce the upper portions of the walls, they are rolled as shown at 37 and for ease in dumping the contents of the hopper 5, a lip 39 is divided at the forward end thereof. As has been pointed out, means are provided on the hopper 5 for interengaging the power operated means on the associated lift truck 7 and in the illustrated structure this means includes an H beam 43 which is attached to and which extends lengthwise along the lower side of the bottom panel 27 of the hopper 5 from a point adjacent the rear wall 35 to a point under front wall 29. As illustrated, the H beam 43 is disposed along the center line of the bottom panel 27. The end of the H beam 43 adjacent to the rear wall 35 has its lower side cut away as shown at 41 (Fig. 1), to facilitate the entrance of the operating member 9 of the power operated mechanism on the lift truck 7 as will be hereinafter described. The H beam serves as a guide or an operating track for means associated with member 9 when the dolly is interconnected with the truck 7.

In order to provide bearings for the hopper 5, a pair of oppositely spaced, downwardly projecting ears 47, drilled with suitable holes to engage shaft 25, are attached to the lower side of the front wall 29 parallel to side walls 31. The shaft 25 extends through the ears 47 and is journalled in the brackets 21. This construction permits the hopper 5 to swing forwardly about the axis provided by the shaft 25. (The hopper 5 is shown in one of its tilted positions by the broken outline in Fig. 1.) When the hopper 5 is in the rest or normal position (the position indicated by the solid outline in Fig. 1) the H beam 43 on the bottom of the hopper 5 rests upon the cross beam 13. In this position, the center of gravity of the hopper 5 both when empty and when full lies rearward of the ears 47, and therefore the hopper 5 is in a stable position.

As has been previously pointed out, the lift truck 7 is provided with a lead engaging means which includes the forks 14 which are engageable with the channels 11 of the dolly 3. In addition, the load engaging means in the illustrated lift truck 7 includes the usual vertical arms or standards 51 and 53 one of which is rigidly connected with each of the forks 14, a reinforcing cross arm 55 extending between and being rigidly interconnected to the standards 51 and 53. The load engaging unit which includes the forks 14, the standards 51 and 53, and the arm 55 is connected to a movable frame 56 on the truck for vertical movement in the conventional manner, the frame 56 being pivotally connected to the truck about an axis 54. The foregoing construction is embodied in most lift trucks but is not a feature of this invention and is not necessary in the practice of the invention.

The power operated mechanism is conveniently connected to the standards 51 and includes a shaft 57 which is journalled for rotation in bearings 59 at the upper ends of arms 51 and 53. The shaft 57 is prevented from moving endwise by suitable means such as the pins 61 which are set in the ends of shaft 57. Rigidly connected to the center of shaft 57 and rotatable therewith is a bifurcated L-shaped member 58 which constitutes a part of the operating member 9. The L-shaped member includes a downwardly extending section 58a and a forwardly extending section 58b. A rotatable wheel or roller 60 is attached to the forward end of each of the arms of the forwardly extending bifurcated section 58b. The rollers 60 have an axis of rotation parallel to cross arm 55 and are rotatably connected to the bifurcated section 58b by means such as a pair of bolts 63. The arms of the forwardly extending bifurcated section 58b are so positioned, and the size of the rotatable wheels 60 are such that the wheels 60 ride in the co-extensive channels or guides provided by the H beam 43 which is attached along the bottom of the hopper 5.

The shaft 57 is connected to a source of power which in the embodiment illustrated, is a hydraulic ram 67 which is supported on a bracket 73 which is connected to the vertical arm 53 by means such as bolts 75. The bracket 73 supports a pin 77 which passes through the lower part of the hydraulic ram assembly allowing the ram to rotate around the axis of the pin 71 which is set parallel to cross arm 55. The ram 67 is operatively coupled with shaft 57 through linking arms 69 which are rigidly connected to shaft 57, the arms 69 being connected to the ram 57 by a pin 71 which passes horizontally through the end of ram and which is rotatably journalled in the pivoted linking arms 69.

Actuating means for moving the ram 67 is provided by a motor and pump assembly 79 and oil reservoir 81 which are located on the lift truck 7 adjacent vertical arm 51. A suitable cover 83 is provided to house the motor unit. With the ram 67 in its shortest or retracted position, the position of the shaft 57 is such that the forwardly extending section 58b of the bifurcated member 58 lies horizontally and, therefore, parallel to forks 14 of the lift truck 7. When the motor and pump 79 are actuated by a suitable control on the tractor, the ram 67 raises the ends of the linking arms 69, thereby causing the shaft 57 to rotate. The rotation of shaft 57 causes the forked member 58 to rotate upwardly as shown by the dotted outline in Fig. 1.

In operation, the hopper 5 in its normal or untilted position is filled with material. When it is desired to move the dolly 3 and hopper 5, the lift truck 7 with the forks 14 in their lowermost vertical position is run to the dolly 3 and the forks 14 are brought into engagement with the channels 11. When the forks 14 engage the channels 11, the rollers 60 are below the cut out portion 41 of the H beam 43. The lift truck 7 controls the movement of the dolly 3 and it can be run to any section of the plant. When brought to a place where the transference of material is desired, the entire dolly 3 and hopper assembly can be lifted by the fork assembly in the usual manner. When the proper height is reached, the fork assembly is brought to rest and the tilting is controlled by an operator who operates the motor and pump assembly which actuates the ram 67. As the ram 67 is raised, the linking arms 69 rotate thereby causing shaft 57 and member 9 to rotate. The rollers 60 engage the channels provided by the H beam 43 and ride therealong, forcing the hopper 5 to rotate about the axis of shaft 25. Thus the hopper 5 can be tilted to any position and retained there for any length of time completely under the control of the operator. When the material has completely drained out of the hopper 5 the hydraulic ram 67 is lowered causing the hopper 5 to return to its original untilted position. The dolly 3 and hopper 5 are then lowered by the fork assembly until the dolly rests once again upon the floor.

The combination of the truck and dumping device which has been described above is operable under all plant conditions. The truck operator can cause the truck to engage or disengage the dumping device, to raise or lower it, or to tilt or dump it without dismounting from his position on the truck. Moreover, the dumping device cannot become disengaged from the forks of the truck when the hopper is in a tilted position because of the mechanical interengagement of the power operated mechanism on the tractor with the guide or track on the hopper. These features make possible safe, rapid, and economical operation of the equipment.

Various of the novel features of the invention are set forth in the appended claims.

I claim:

1. An improved dumping device comprising a dolly, a hopper pivotally mounted on said dolly, a guide on said hopper, a lift truck having a movable load engaging means, and power operated means attached to said lift truck and movable with said load engaging means, including a pivoted member having means engageable with said guide on said hopper when said load engaging means is interconnected with said dolly, said pivoted member being operable to tilt said hopper relative to said dolly.

2. An improved dumping device comprising a dolly, a hopper pivotally mounted on said dolly, a track on said hopper, a fit truck having a load engaging means, and hydraulically controlled means attached to said lift truck and movable with said load engaging means including a pivoted member having means engageable with said track on said hopper when said load engaging means is interconnected with said dolly, said pivoted member being operable to tilt said hopper relative to said dolly.

3. An improved dumping device comprising a dolly, a hopper pivotally mounted on said dolly, a track on the bottom of said hopper, a lift truck having a load engaging means, and hydraulically controlled means attached to said lift truck and movable with said load engaging means, said hydraulically controlled means including a first pivotally supported member, a hydraulic ram attached to said first pivotally supported member for effecting its rotation, and a second pivotally supported member mechanically connected to said first pivotally supported member and having means engageable with said track on said hopper when said load engaging means is interconnected with said dolly, said second pivoted member being operable to tilt said hopper relative to said dolly.

4. An improved dumping device comprising a lift truck, forks on said lift truck, a dolly, channels on said dolly which are proportioned to receive the forks of said lift truck, a hopper pivotally mounted on said dolly having its center of gravity to the rear of the pivot, a double track on the bottom of said hopper defined by the channels of an H beam, hydraulically controlled means attached to said lift truck movable with said forks, said hydraulically controlled means including a ram attached to a pivoted linking member for rotating said linking member, a second pivoted member rotated by said linking member and said second pivoted member having a pair of arms, a roller connected to each of said arms and engageable with said double track on said hopper when said forks are interconnected with said channels on said dolly, said second pivoted member being operable to tilt the hopper relative to said dolly to discharge material contained in said hopper.

5. An improved dumping device which is adapted for use with a lift truck having movable load engaging means comprising a dolly which is adapted to be engaged by the load engaging means of the associated lift truck, a hopper pivotally mounted on said dolly, and means including a power operated pivoted member attached to the movable load engaging means of the associated lift truck, said pivoted member being engageable with said hopper whenever said dolly is engaged by said load engaging means and being operable to tilt said hopper relative to said dolly to discharge the material contained in said hopper.

ROLAND E. MILLER.

REFERENCES CITED

The following references are of record in the file of this patent:

UNITED STATES PATENTS

| Number | Name | Date |
|---|---|---|
| 1,628,389 | Cochran | May 10, 1927 |
| 1,998,731 | Newcomb | Apr. 23, 1935 |
| 2,034,674 | Edwards | Mar. 17, 1936 |
| 2,482,692 | Quales et al. | Sept. 20, 1949 |